(12) United States Patent
Lee et al.

(10) Patent No.: US 10,787,166 B2
(45) Date of Patent: Sep. 29, 2020

(54) HYBRID ELECTRIC VEHICLE AND METHOD OF CONTROLLING SHIFT PATTERN THEREFOR

(71) Applicants: HYUNDAI MOTOR COMPANY, Seoul (KR); KIA MOTORS CORPORATION, Seoul (KR)

(72) Inventors: Jea Mun Lee, Seoul (KR); Ji Hoon Kang, Seoul (KR); Sung Hoon Yu, Hwaseong-si (KR); Jung Min Cha, Incheon (KR); Joon Young Park, Seoul (KR); Sung Deok Kim, Seongnam-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 356 days.

(21) Appl. No.: 15/834,585

(22) Filed: Dec. 7, 2017

(65) Prior Publication Data

US 2018/0354497 A1    Dec. 13, 2018

(30) Foreign Application Priority Data

Jun. 8, 2017    (KR) .......................... 10-2017-0071746

(51) Int. Cl.
*B60W 20/40* (2016.01)
*B60W 20/30* (2016.01)

(52) U.S. Cl.
CPC ............ *B60W 20/40* (2013.01); *B60W 20/30* (2013.01); *B60W 2510/06* (2013.01); *B60W 2510/08* (2013.01); *B60W 2900/00* (2013.01); *Y10S 903/945* (2013.01)

(58) Field of Classification Search
CPC ............ B60W 20/40; B60W 2510/06; B60W 2510/08; B60W 2900/00; B60W 20/20; B60W 20/30; B60W 10/06; B60W 10/08; B60W 10/10–115; Y01S 903/945; Y10S 903/945
USPC .......................................................... 701/22
See application file for complete search history.

(56) References Cited

U.S. PATENT DOCUMENTS

| | | | | | |
|---|---|---|---|---|---|
| 5,789,882 | A | * | 8/1998 | Ibaraki | B60K 6/48 318/148 |
| 5,841,201 | A | * | 11/1998 | Tabata | B60K 6/365 290/40 C |
| 5,842,534 | A | * | 12/1998 | Frank | B60K 6/48 180/65.25 |
| 5,873,426 | A | * | 2/1999 | Tabata | B60K 6/365 180/65.7 |
| 5,982,045 | A | * | 11/1999 | Tabata | B60K 6/48 290/17 |

(Continued)

*Primary Examiner* — Spencer D Patton
(74) *Attorney, Agent, or Firm* — Morgan, Lewis & Bockius LLP (57) ABSTRACT

A hybrid electric vehicle which may effectively determine a point in time of shift pattern change and a method of controlling a shift pattern therefor are disclosed. The method includes determining whether or not a request for shift pattern change is received, determining HEV mode related conditions, in response to a determination that the request for shift pattern change is received, and changing a shift pattern according to the request for shift pattern change, in response to a determination that the HEV mode related conditions are satisfied.

15 Claims, 7 Drawing Sheets

(56) References Cited

U.S. PATENT DOCUMENTS

| | | | | |
|---|---|---|---|---|
| 6,098,733 | A * | 8/2000 | Ibaraki | B60K 6/543 |
| | | | | 180/65.28 |
| 2002/0062183 | A1* | 5/2002 | Yamaguchi | B60K 6/46 |
| | | | | 701/22 |
| 2008/0196954 | A1* | 8/2008 | Soliman | B60K 6/48 |
| | | | | 180/65.25 |
| 2009/0082154 | A1* | 3/2009 | Iwase | B60K 6/445 |
| | | | | 475/150 |
| 2013/0333517 | A1* | 12/2013 | Osuka | B60K 6/48 |
| | | | | 74/661 |
| 2015/0353071 | A1* | 12/2015 | Tanishima | B60W 10/115 |
| | | | | 701/22 |
| 2016/0046280 | A1* | 2/2016 | Lee | B60W 20/30 |
| | | | | 701/22 |
| 2016/0221571 | A1* | 8/2016 | Chen | B60W 10/06 |

* cited by examiner

HYBRID ELECTRIC VEHICLE AND METHOD OF CONTROLLING SHIFT PATTERN THEREFOR

This application claims the benefit of Korean Patent Application No. 10-2017-0071746, filed on Jun. 8, 2017, which is hereby incorporated by reference as if fully set forth herein.

TECHNICAL FIELD

The present disclosure relates to a hybrid electric vehicle and a method of controlling a shift pattern therefor, and more particularly, to a hybrid electric vehicle which may effectively determine a point in time of shift pattern change and a method of controlling a shift pattern therefor.

BACKGROUND

In general, a hybrid electric vehicle (HEV) is a vehicle which uses two types of power sources, and the two types of power sources are mainly an engine and an electric motor. Such a hybrid electric vehicle has excellent fuel efficiency and power performance and is advantageous in reduction in exhaust gas, as compared to a vehicle provided with an internal combustion engine alone, and thus has been vigorously developed.

A hybrid electric vehicle may be operated in two driving modes according to types of powertrains which are driven. One is an electric vehicle (EV) mode in which the hybrid electric vehicle is driven using only the electric motor, and the other is a hybrid electric vehicle (HEV) mode in which the hybrid electric vehicle is driven by operating both the electric motor and the engine. The hybrid electric vehicle performs transition between the two modes according to conditions during driving.

In addition to the above-described division of driving modes according to powertrains, a plug-in hybrid electric vehicle (PHEV) may be operated in a charge depleting mode (CD) and a charge sustaining (CS) mode based on change of a state of charge (SOC) of a battery. In general, in the CD mode, the PHEV is driven by operating an electric motor using power of the battery and, in the CS mode, power of an engine is mainly used so that the SOC of the battery is not lowered any more.

A general PHEV is driven in the CD mode regardless of driving conditions, such as driving load, whether or not the battery can be charged, a distance to a destination, etc., and then performs transition from the CD mode to the CS mode according to exhaustion of the SOC. Such mode transition based on the SOC alone causes an efficiency problem and, thus, an adaptive mode transition method may be considered. The adaptive mode transition method is a control method in which, if a vehicle is driven a longer distance than an all-electric range (AER) using only an electric motor, the CD and CS modes are automatically converted according to the optimum efficiency using a distance until charge (DUC), a distance to empty (DTE) in the EV mode, driving conditions, etc.

For example, if the adaptive mode transition method is applied to a hybrid electric vehicle, the vehicle may be driven in the CS mode when a current driving load is a designated value or more and be driven in the CD mode when the current driving load is low, based on driving conditions. Of course, the vehicle may be driven in the CD mode so as to exhaust the SOC of the battery within the DUC, if DUC≤DTE even in a section in which the driving load is high.

If the driving modes of the vehicle are divided into the CD and CS modes, configurations of a powertrain mainly used in the respective modes are different, and shift patterns in the respective modes thus are prepared. Here, a shift pattern is a group of shift lines optimized to a driving situation (for example, Power On Up Shift, Power On Down Shift or Kick Down). Particularly, shift patterns in a hybrid electric vehicle may be divided into several kinds below.

Figure 1A:
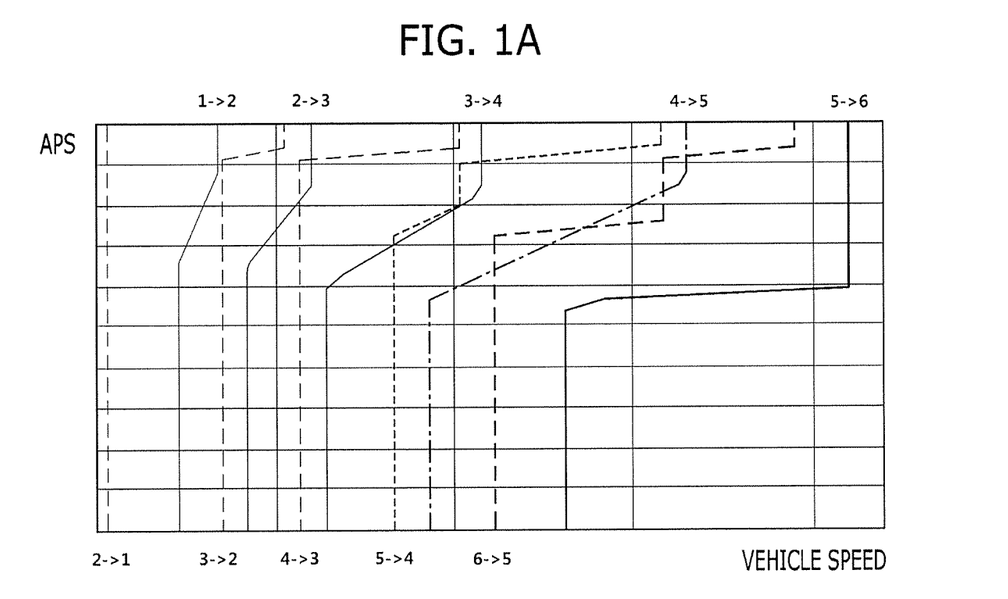
FIG. 1A is a graph exemplarily illustrating a general CD shift pattern.
Figure 1B:
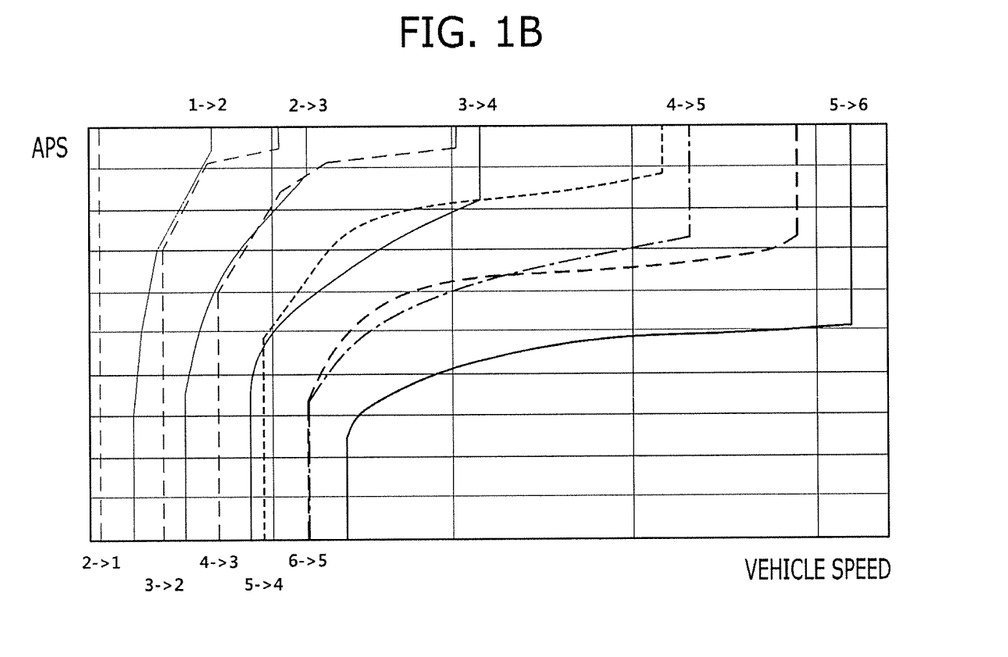
FIG. 1B is a graph exemplarily illustrating a general CS shift pattern.

CS shift pattern: a group of shift lines developed for the purpose of raising system efficiency when the hybrid electric vehicle is driven in the HEV mode low SOC shift pattern: a group of shift lines developed to be optimized to charging CD shift pattern: a group of shift lines developed to be optimized to EV driving Uphill shift pattern: a group of shift lines developed to be optimized to an uphill situation For example, the CD shift pattern and the CS shift pattern are shown in FIGS. 1A and 1B.

FIG. 1A is a graph illustrating a general CD shift pattern, and FIG. 1B is a graph exemplarily illustrating a general CS shift pattern.

With reference to FIGS. 1A and 1B, in the CD shift pattern and the CS shift pattern, a solid line represents an up-shift line, a dotted line represents a down-shift line, and a gear position of a transmission is determined according to a driving situation expressed as a vehicle speed and an accelerator pedal sensor (APS) value. Through comparison between the CD shift pattern and the CS shift pattern, the CD shift pattern has broad areas of which respective gear positions take charge according to vehicle speed and has linearity, as compared to the CS shift pattern, and, in the CS shift pattern, the highest gear position is in charge of a relatively low vehicle speed and a relatively low APS value.

This is executed in consideration of power characteristics and efficiency. For example, an electric motor has flat torque but has low efficiency at high power, and an engine has torque, which increases with increasing RPM (revolutions per minute), but has low efficiency in low-torque driving. Therefore, in the CD shift pattern, the respective shift lines are determined on the assumption that a main power source is the electric motor and, in the CS shift pattern, transition between the HEV mode and the EV mode frequently occurs and thus the respective shift lines are determined based on efficiency of the engine. Therefore, in transition between the CD mode and the CS mode, shifting occurs due to shift pattern change even under the same driving situation (at the same APS value and vehicle speed). Such a phenomenon occurs not only in change between the CD pattern and the CS pattern but also occurs in change from an electric motor-oriented shift pattern to an engine-oriented shift pattern or vice versa. Such a problem will be described with reference to FIGS. 2A and 2B.

Figure 2A:
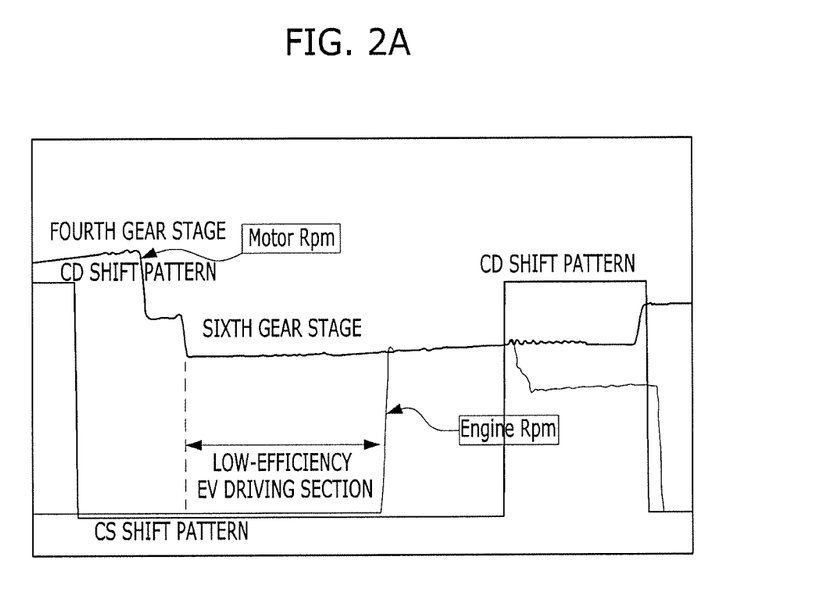
FIG. 2A is a graph illustrating problems caused by shift pattern change in transition to a CS mode in a general hybrid electric vehicle.
Figure 2B:
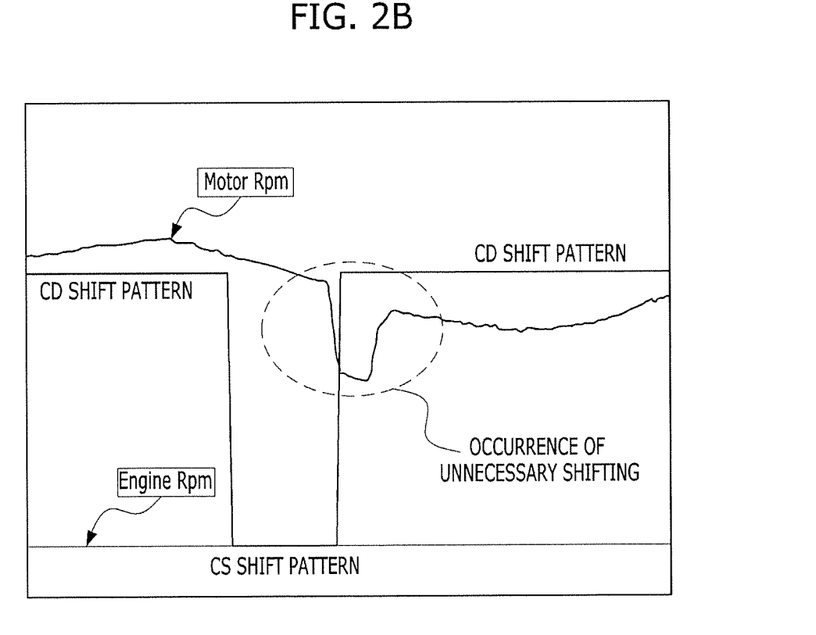
FIG. 2B is a graph illustrating problems caused by shift pattern change in transition to a CD mode in the general hybrid electric vehicle.

FIG. 2A is a graph illustrating problems caused by shift pattern change in transition to the CS mode in a general hybrid electric vehicle, and FIG. 2B is a graph illustrating problems caused by shift pattern change in transition to the CD mode in the general hybrid electric vehicle.

First, with reference to FIG. 2A, as the hybrid electric vehicle performs transition from the CD mode to the CS mode, the CD shift pattern in which efficiency of an electric motor is considered is changed to the CS shift pattern in which efficiency of an engine is considered. However, if the CD shift pattern is changed to the CS shift pattern according to transition to the CS mode but the hybrid electric vehicle is actually driven in the EV mode, only the electric motor is driven in the off state of the engine but the hybrid electric vehicle follows the CS shift pattern. Therefore, EV driving having low efficiency is carried out until an HEV mode transition (engine start) time from shifting due to the CS shift pattern.

Further, with reference to FIG. 2B, if the CS shift pattern is changed to the CD shift pattern, unnecessary shifting according to shift pattern change is carried out even through the engine is still in the off state, thus, energy loss occurs.

SUMMARY

Accordingly, the present disclosure is directed to a hybrid electric vehicle and a method of controlling a shift pattern therefor that substantially obviate one or more problems due to limitations and disadvantages of the related art.

An object of the present disclosure is to provide a method of effectively executing shift pattern transition control and a hybrid electric vehicle which executes the same.

Another object of the present disclosure is to provide a method of executing optimum shift pattern transition control according to a mode transition direction and a hybrid electric vehicle which executes the same.

Additional advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the disclosure, as embodied and broadly described herein, a method of controlling shift pattern change of a hybrid electric vehicle includes determining whether or not a request for shift pattern change is received, determining HEV mode related conditions, in response to a determination that the request for shift pattern change is received, and changing a shift pattern according to the request for shift pattern change, in response to a determination that the HEV mode related conditions are satisfied.

In another aspect of the present disclosure, a hybrid electric vehicle includes a first controller configured to determine whether or not a request for shift pattern change is received, to determine HEV mode related conditions, in response to a determination that the request for shift pattern change is received, and to determine to change of a shift pattern according to the request for shift pattern change, in response to a determination that the HEV mode related conditions are satisfied, and a second controller configured to control a transmission and to change the shift pattern according to a control command from the first controller.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Reference will now be made in detail to the preferred embodiments of the present disclosure, examples of which are illustrated in the accompanying drawings. However, the disclosure of the invention is not limited to the embodiments set forth herein and may be variously modified. In the drawings, in order to clearly describe the present disclosure, description of elements which are not related to the present disclosure is omitted, and the same or similar elements are denoted by the same reference numerals even though they are depicted in different drawings.

In the following description of the embodiments, it will be understood that, when a part "includes" an element, the part may further include other elements and does not exclude presence of the elements, unless stated otherwise.

Prior to description of a mode transition method in accordance with one embodiment of the present disclosure, a hybrid electric vehicle structure to which embodiments of the present disclosure is applicable will be described with reference to FIG. 3.

Figure 3:
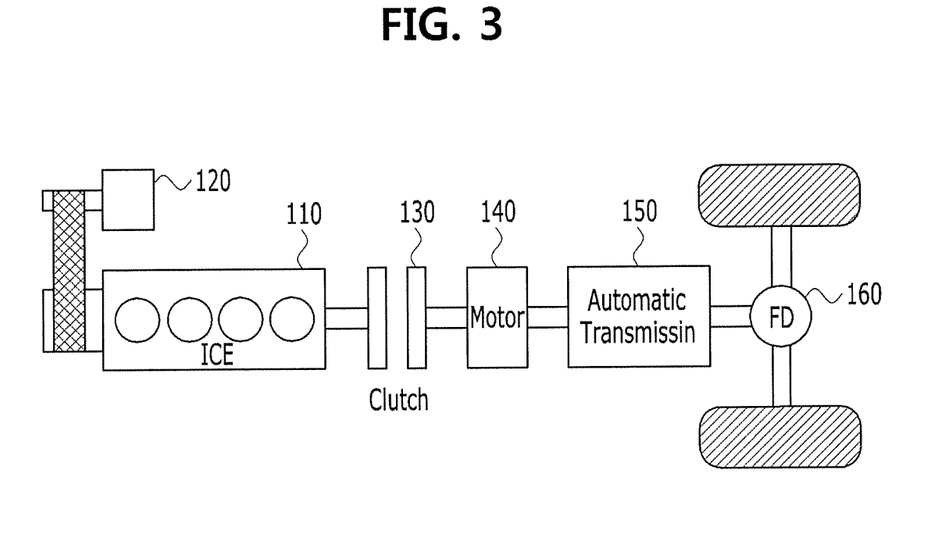
FIG. 3 is a view exemplarily illustrating a powertrain structure of a hybrid electric vehicle to which embodiments of the present disclosure are applicable.

FIG. 3 is a view exemplarily illustrating a powertrain structure of a hybrid electric vehicle to which the embodiments of the present disclosure are applicable.

FIG. 3 exemplarily illustrates a powertrain of a hybrid electric vehicle employing a parallel type hybrid system in which an electric motor 140 (or a driving motor) and an engine clutch (EC) 130 are installed between an internal combustion engine (ICE) 110 and a transmission 150.

In such a vehicle, if a driver presses an accelerator after turning the vehicle on, the electric motor 140 is first driven using power of a battery in an open state of the engine clutch 130 and power of the electric motor 140 moves wheels via the transmission 150 and a final drive (FD) 160 (i.e., in the EV mode). If the vehicle is gradually accelerated and thus requires greater driving power, an secondary motor (or a starter generator motor 120) is operated and may thus drive the ICE 110.

Thereby, when RPMs of the ICE 110 and the electric motor 140 become equal, the engine clutch 130 is closed and the vehicle is driven using both the ICE 110 and the electric motor 140 or using only the ICE 110 (i.e., transition from the EV mode to the HEV mode). If predetermined engine off conditions are satisfied, i.e., the vehicle is decelerated, the engine clutch 130 is open and the ICE 110 is stopped (i.e., transition from the HEV mode to the EV mode). Further, in the hybrid electric vehicle, driving power of the wheels is converted into electric energy during braking and may thus charge the battery, and this is referred to as brake energy regeneration or regenerative braking.

The starter generator motor 120 serves as a starter motor when the ICE 110 is started and serves as a generator when rotational energy of the ICE 110 is recovered after starting the ICE 110 or when the ICE 110 is off, and may thus be referred to as a "hybrid starter generator (HSG)" or referred to as an "secondary motor" in some cases.

Figure 4:
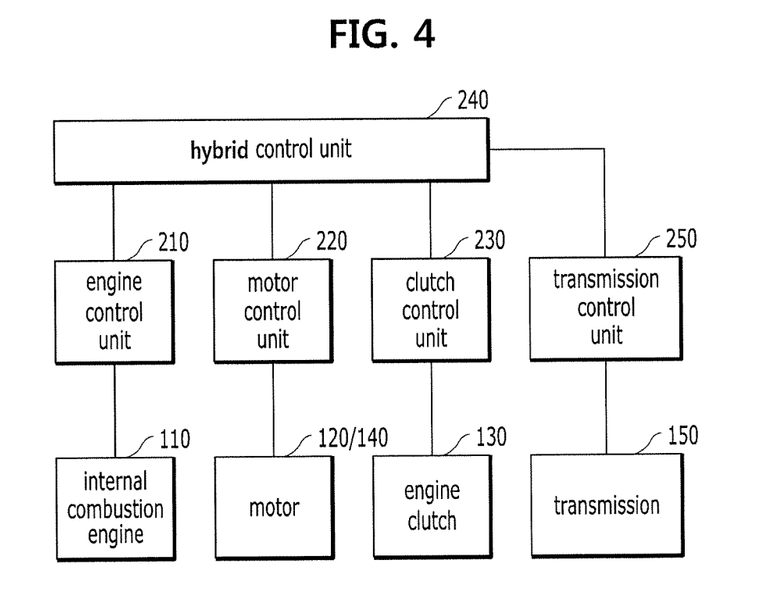
FIG. 4 is a block diagram exemplarily illustrating a control system of a hybrid electric vehicle to which embodiments of the present disclosure are applicable.

Mutual relations among control units in a vehicle to which the above-described powertrain is applied are illustrated in FIG. 4.

FIG. 4 is a block diagram exemplarily illustrating a control system of a hybrid electric vehicle to which embodiments of the present disclosure are applicable.

With reference to FIG. 4, in the hybrid electric vehicle to which embodiments of the present disclosure are applicable, an internal combustion engine 110 may be controlled by an engine control unit 210, torques of a starter generator motor 120 and an electric motor 140 may be controlled by a motor control unit (MCU) 220, and an engine clutch 130 may be controlled by a clutch control unit 230. Here, the engine control unit 210 may be referred to as an engine management system (EMS). Further, a transmission 150 is controlled by a transmission control unit 250. In some cases, the starter generator motor 120 and the electric motor 140 may be respectively controlled by separate motor control units.

The respective control units are connected to an upper-level control unit, i.e., a hybrid control unit (HCU) 240 which performs the entirety of a mode transition process and may thus provide information necessary to control the engine clutch 130 in driving mode transition and gear shifting and/or information necessary to control stoppage of the internal combustion engine 110 to the hybrid control unit 240 or perform operation according to a control signal under the control of the hybrid control unit 240.

In more detail, the hybrid control unit 240 determines whether or not mode transition is performed according to a driving state of the vehicle. For example, the hybrid control unit 240 determines a point in time when the engine clutch 130 is open, and performs hydraulic pressure control (if the engine clutch 130 is a wet engine clutch) or torque capacity control (if the engine clutch 130 is a dry engine clutch) when the engine clutch 130 is open. Further, the hybrid control unit 240 may determine a state (lock-up, slip of opening) of the engine clutch 130 and control a point in time when fuel injection of the internal combustion engine 110 is stopped. Further, in order to control stoppage of the internal combustion engine 110, the hybrid control unit 240 may transmit a torque command to control torque of the starter generator motor 120 to the motor control unit 220 and thus control recovery of engine rotational energy. Further, in adaptive mode transition control, the hybrid control unit 240 may control lower-level control units for determination of mode transition conditions and for performing mode transition.

Particularly, the hybrid control unit 240 may determine whether or not transition between the CS and CD modes is carried out, determine whether or not shift pattern change is carried out and a point in time when the shift pattern change is carried out, and notify the transmission control unit 250 of results of determination.

Of course, connection relations between the above-described control units and functions/classifications of the respective control units are exemplary and thus it will be apparent to those skilled in the art that the names of the control units are not limited. For example, any one of other control units except for the hybrid control unit 240 may be implemented as having the functions of the hybrid control unit 240, or the functions of the hybrid control unit 240 may be distributed to two or more other control units except for the hybrid control unit 240.

Hereinafter, based on the above-described vehicle structure, a method of effectively controlling shift pattern change in accordance with one embodiment of the present disclosure will be described.

One embodiment of the present disclosure proposes a criterion to determine the most effective point in time of pattern change, if a request for change between a motor efficiency-oriented shift pattern and an engine efficiency-oriented shift pattern is received. Therefore, this embodiment may be divided into a case that the motor efficiency-oriented shift pattern is changed to the engine efficiency-oriented shift pattern, and a case that the engine efficiency-oriented shift pattern is changed to the motor efficiency-oriented shift pattern.

First, the case that the motor efficiency-oriented shift pattern is changed to the engine efficiency-oriented shift pattern will be described with reference to FIGS. 5A and 5B.

Figure 5A:
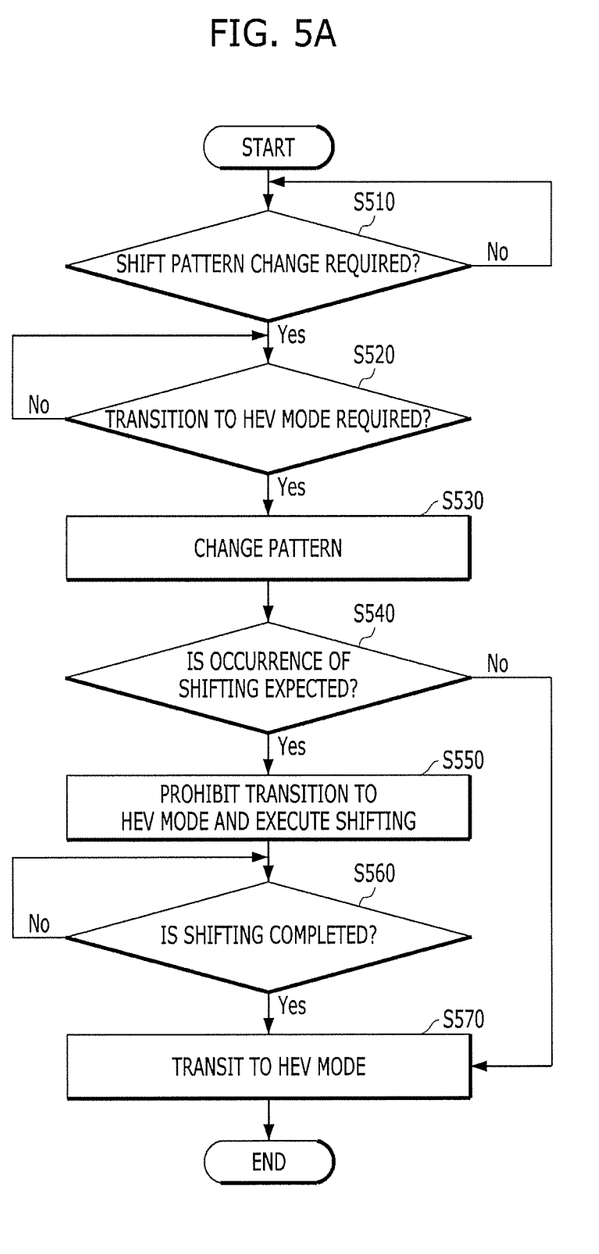
FIG. 5A is a flowchart exemplarily illustrating one exemplary shift pattern change control process in accordance with one embodiment of the present disclosure.
Figure 5B:
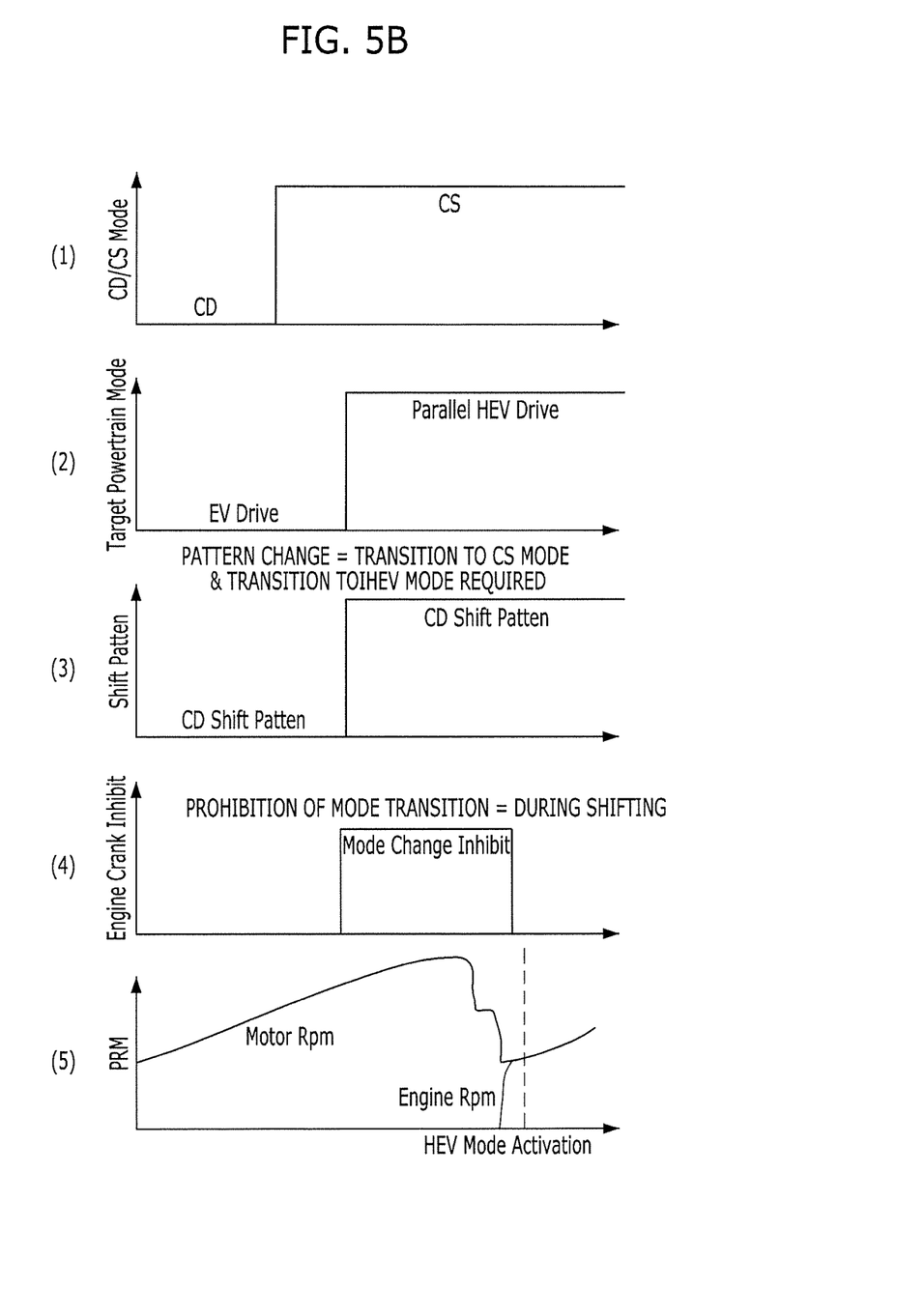
FIG. 5B shows graphs illustrating state change according to the shift pattern change control process of FIG. 5A.

FIG. 5A is a flowchart exemplarily illustrating one exemplary shift pattern change control process in accordance with one embodiment of the present disclosure, and FIG. 5B shows graphs illustrating state change according to the shift pattern change control process of FIG. 5A.

First, with reference to FIG. 5A, when changing the motor efficiency-oriented shift pattern to the engine efficiency-oriented shift pattern is required (S510), whether or not a transition to the HEV mode is required may be determined (S520). For example, if the hybrid control unit determines transition from the CD mode to the CS mode, it may be determined that the changing the motor efficiency-oriented shift pattern to the engine efficiency-oriented shift pattern is required. Further, whether or not the transition to the HEV mode is required may be determined according to a determination of the hybrid control unit, as to whether or not the engine is started.

When the changing the motor efficiency-oriented shift pattern to the engine efficiency-oriented shift pattern is required and the transition to the HEV mode is required, the CD shift pattern may be changed to the CS shift pattern (S530). Shift pattern may be changed through a method in which the hybrid control unit transmits a pattern change command to the transmission control unit, but the disclosure is not limited thereto.

Here, if shifting due to a vehicle speed and an APS value is expected (S540), the hybrid control unit may delay engine starting and execute shifting first (S550). When shifting is completed (S560), the hybrid control unit may execute HEV mode driving by starting the engine (S570).

In summary of the process of FIG. 5A, when the motor efficiency-oriented shift pattern is changed to the engine efficiency-oriented shift pattern, transition to the CS shift pattern is delayed until a request for starting the engine is received, and whether or not shifting occurs in transition from a current pattern to a target pattern is determined. Thereafter, if occurrence of shifting is expected, shifting may be executed first and, after shifting, the engine may be started.

FIG. 5B shows five graphs, i.e., graphs (1) to (5) and, in each graph, the horizontal axis represents time and the vertical axis represents state change. Further, it is assumed that graphs (1) to (5) share the horizontal axis and the same point on the horizontal axis represents the same point in time.

After change from the CD mode to the CS mode is determined, as exemplarily shown in graph (1), when a transition to the HEV mode is required, as exemplarily shown in graph (2), the shift pattern is changed, as exemplarily shown in graph (3). Here, if occurrence of shifting is expected, engine starting is delayed until shifting is completed, as exemplarily shown in graph (4) and, when shifting is completed, engine starting and transition to the HEV mode may be executed, as exemplarily shown in graph (5).

Next, the case that the engine efficiency-oriented shift pattern is changed to the motor efficiency-oriented shift pattern will be described with reference to FIGS. 6A and 6B.

Figure 6A:
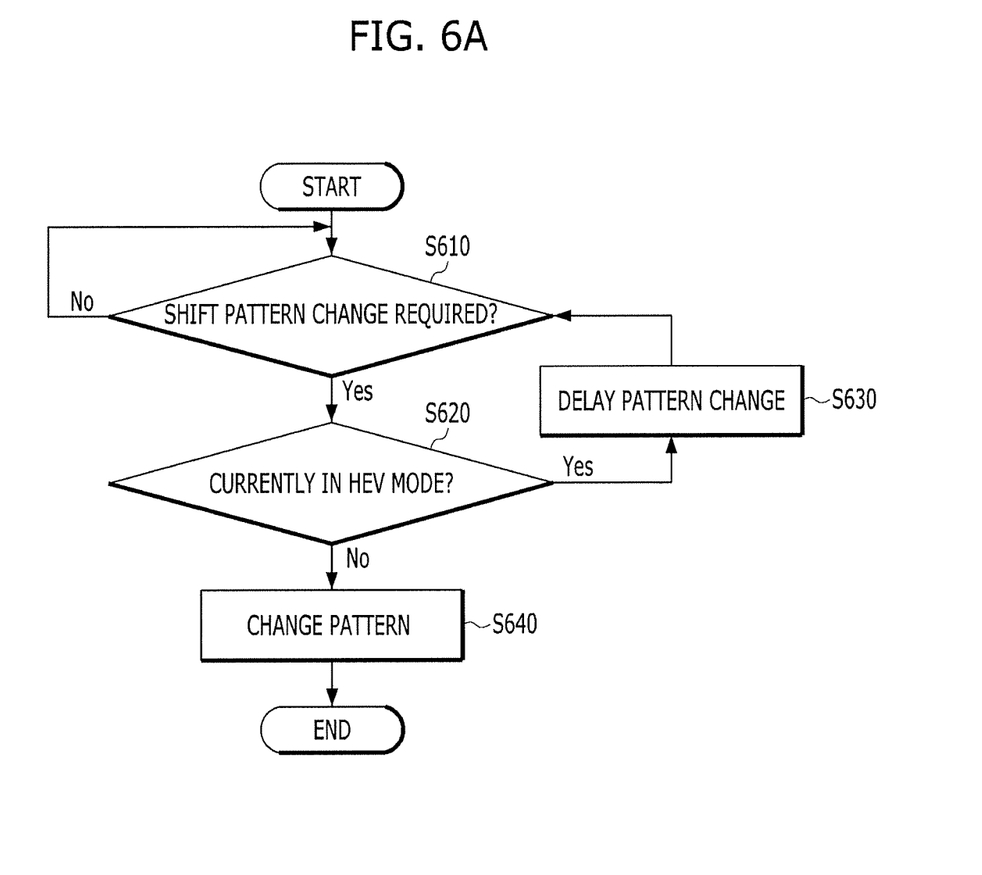
FIG. 6A is a flowchart exemplarily illustrating another exemplary shift pattern change control process in accordance with one embodiment of the present disclosure.
Figure 6B:
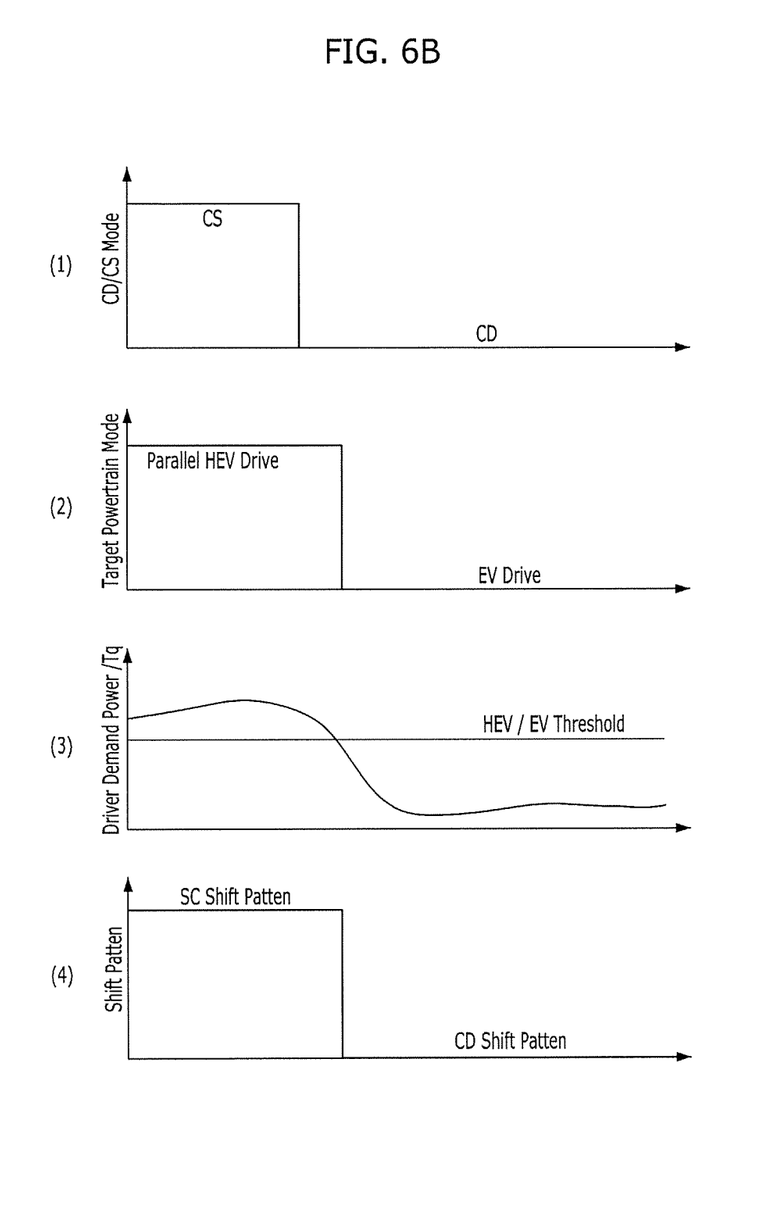
FIG. 6B shows graphs illustrating state change according to the shift pattern change control process of FIG. 6A.

FIG. 6A is a flowchart exemplarily illustrating another exemplary shift pattern change control process in accordance with one embodiment of the present disclosure, and FIG. 6B shows graphs illustrating state change according to the shift pattern change control process of FIG. 6A.

First, with reference to FIG. 6A, when changing the engine efficiency-oriented shift pattern to the motor efficiency-oriented shift pattern is required (S610), whether or not HEV mode driving is carried out may be determined (S620). For example, if the hybrid control unit determines a transition from the CS mode to the CD mode, it may be determined that the changing the engine efficiency-oriented shift pattern to the motor efficiency-oriented shift pattern is required. Further, at least a case that the hybrid electric vehicle is actually driven in the HEV mode at a point in time when the shift pattern change is required, a case that there is a high possibility of HEV mode driving, or a case that a transition to the HEV mode is required may correspond to HEV mode driving. Here, the case that there is a high possibility of HEV mode driving may be a situation in which drop in the SOC due to uphill driving, high-speed driving or use of a high electrical load is expected. Condition as to whether or not HEV mode driving is carried out may be variously set according to reasons for shift pattern change, and various conditions, such as two or more conditions, may be combined depending on the situation.

In case that the hybrid electric vehicle is actually driven in the HEV mode or there is a high possibility of HEV mode driving, shift pattern change may be delayed (S630), and in case that the hybrid electric vehicle is not actually driven in the HEV mode or there is a low possibility of HEV mode driving, the shift pattern may be changed (S640). The reason for this is that, while the engine is starting or if there is a high possibility of starting the engine, application of the engine efficiency-oriented shift pattern is still advantageous.

FIG. 6B shows four graphs, i.e., graphs (1) to (4) and, in each graph, the horizontal axis represents time and the vertical axis represents state change. Further, it is assumed that graphs (1) to (4) share the horizontal axis and the same point on the horizontal axis represents the same point in time.

After change from the CS mode to the CD mode is determined, as exemplarily shown in graph (1), shift pattern change is not carried out while HEV mode driving is executed, as exemplarily shown in graph (2). When change conditions to the EV mode are satisfied, as exemplarily shown in graph (3), change to the EV mode and shift pattern change may be executed, as exemplarily shown in graphs (2) and (4).

If shift pattern change control in accordance with the above-described embodiment of the present disclosure is executed, a low-efficiency EV section and unnecessary shifting are reduced and thus lowering of performance due to shift pattern transition may be minimized. Particularly, the number of times of lowering of linearity in acceleration/deceleration due to shifting may be reduced, drivability may be improved, and energy consumption due to unnecessary shifting may be reduced.

Further, such shift pattern change control may be applied to CD-CS mode transition of a PHEV and, if such shift pattern change control is applied to adaptive CD-CS mode transition in which transition frequently occurs, maximized effects are expected.

The above-described method in accordance with the embodiment may be implemented as computer readable code in a computer readable recording medium in which a program is recorded. Computer readable recording media include all kinds of recording devices in which data readable by computer systems is stored. The computer readable recording media include a Hard Disk Drive (HDD), a Solid State Drive (SSD), a Silicon Disk Drive (SDD), a ROM, a RAM, a CD-ROM, a magnetic tape, a floppy disk, an optical data storage system, etc. Further, the computer readable recording media may be realized as a carrier wave (for example, transmission over the Internet).

The various embodiments disclosed herein, including embodiments of the hybrid control unit, the engine control unit, the motor control unit, the clutch control unit, and transmission control unit, or any other controller or control unit can be implemented using one or more processors coupled to a memory (or the above computer readable recording medium) storing computer-executable instructions for causing the processors to perform the functions described above including the functions described in relation to the hybrid control unit, the engine control unit, the motor control unit, the clutch control unit, and transmission control unit, or any other controller or control unit.

As is apparent from the above description, a hybrid electric vehicle in accordance with at least one embodiment of the present disclosure may effectively execute shift pattern change control.

Particularly, shift pattern change control is executed in consideration of driving conditions, such as a direction of mode transition, whether or not an engine is started, and whether or not shifting is carried out, and thus driving efficiency of the vehicle may be improved through optimum shifting.

It will be apparent to those skilled in the art that various modifications and variations can be made in the present disclosure without departing from the spirit or scope of the invention. Thus, it is intended that the present disclosure cover the modifications and variations of this disclosure provided they come within the scope of the appended claims and their equivalents.

What is claimed is:
1. A method of controlling shift pattern change of a hybrid electric vehicle (HEV), the method comprising:
    determining whether or not a shift pattern change is required;

determining whether or not an HEV mode related condition is satisfied, in response to a determination that the shift pattern change is required; and performing the shift pattern change according to a determination that the shift pattern change is required, when it is determined that the HEV mode related condition is satisfied, wherein the determining whether or not a shift pattern change is required comprises:

determining whether a first shift pattern change from a first shift pattern based on motor efficiency to a second shift pattern based on engine efficiency is required or a second shift pattern change from the second shift pattern to the first shift pattern is required, and wherein, in response to the determination that the first shift pattern change is required, the HEV mode related condition being satisfied comprises determination that a transition from an EV mode to an HEV mode is going to occur.

2. The method according to claim 1, further comprising:
determining whether or not shifting occurs, after performing the first shift pattern change;
delaying mode transition to the HEV mode until shifting is completed, in response to a determination that occurrence of shifting is expected; and
executing the mode transition when shifting is completed.

3. The method according to claim 1, further comprising delaying the first shift pattern change until the determination of the transition from the EV mode to the HEV mode is made, in response to the determination that the first shift pattern change is required.

4. The method according to claim 1, wherein, in response to a determination that the second shift pattern change is required, the HEV mode related condition being satisfied comprises at least one of a case that the hybrid electric vehicle is not driven in the HEV mode and a case that there is a low possibility that the hybrid electric vehicle is driven in the HEV mode.

5. The method according to claim 4, wherein the case that there is a low possibility that the hybrid electric vehicle is driven in the HEV mode excludes at least an uphill driving situation, a high-speed driving situation or a situation using low electrical load.

6. The method according to claim 4, further comprising, in response to a determination that the HEV mode related condition is not satisfied, delaying the second shift pattern change until the HEV mode related condition is satisfied.

7. The method according to claim 1, wherein:
the first shift pattern includes a charge depleting (CD) shift pattern; and
the second shift pattern includes a charge sustaining (CS) shift pattern.

8. A non-transitory computer readable recording medium having a program recorded therein to implement the method according to claim 1.

9. A hybrid electric vehicle comprising:
a first controller configured to:
determine whether or not a shift pattern change is required, determine whether or not a HEV mode related condition is satisfied in response to a determination that the shift pattern change is required, and determine to perform the shift pattern change according to the determination that the shift pattern change is required, when it is determined that the HEV mode related condition is satisfied; and a second controller configured to control a transmission, wherein the second controller is further configured to perform the shift pattern change according to a control command from the first controller, wherein the first controller determines whether a first shift pattern change from a first shift pattern based on motor efficiency to a second shift pattern based on engine efficiency is required, or a second shift pattern change from the second shift pattern to the first shift pattern is required, and wherein, in response to the determination that the first shift pattern change is required, the HEV mode related condition being satisfied comprises determination that a transition from an EV mode to an HEV mode is going to occur.

10. The hybrid electric vehicle according to claim 9, wherein the first controller is further configured to:
determine whether or not shifting occurs, after performing the first shift pattern change,
delay mode transition to the HEV mode until shifting is completed, in response to a determination that occurrence of shifting is expected, and
execute the mode transition when shifting is completed.

11. The hybrid electric vehicle according to claim 9, wherein the first controller is further configured to delay the first shift pattern change until the determination of the transition from the EV mode to the HEV mode is made, in response to the determination that the first shift pattern change is required.

12. The hybrid electric vehicle according to claim 9, wherein, in response to a determination that the second shift pattern change is required, the HEV mode related condition being satisfied comprises at least one of a case that the hybrid electric vehicle is not driven in the HEV mode and a case that there is a low possibility that the hybrid electric vehicle is driven in the HEV mode.

13. The hybrid electric vehicle according to claim 12, wherein the case that there is a low possibility that the hybrid electric vehicle is driven in the HEV mode excludes at least one of an uphill driving situation, a high-speed driving situation and a situation using low electrical load.

14. The hybrid electric vehicle according to claim 12, wherein, in response to a determination that the HEV mode related condition is not satisfied, the first controller is configured to delay the second shift pattern change until the HEV mode related condition is satisfied.

15. The hybrid electric vehicle according to claim 9, wherein:
the first shift pattern includes a CD shift pattern; and
the second shift pattern includes a CS shift pattern.

* * * * *